(12) United States Patent
Malkin et al.

(10) Patent No.: US 9,483,143 B2
(45) Date of Patent: Nov. 1, 2016

(54) METHOD AND SYSTEM PROVIDING VIEWING-ANGLE SENSITIVE GRAPHICS INTERFACE SELECTION COMPENSATION

(71) Applicant: International Business Machines Corporation, Armonk, NY (US)

(72) Inventors: Peter K. Malkin, Yorktown Heights, NY (US); Calvin B. Swart, Poughkeepsie, NY (US); Jessica J. Tran, Seattle, WA (US); Sharon M. Trewin, Croton-on-Hudson, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 273 days.

(21) Appl. No.: 14/039,760

(22) Filed: Sep. 27, 2013

(65) Prior Publication Data

US 2015/0095815 A1    Apr. 2, 2015

(51) Int. Cl.
| | |
|---|---|
| *G06F 3/041* | (2006.01) |
| *G06F 3/0484* | (2013.01) |
| *G06F 3/01* | (2006.01) |
| *G06F 3/0482* | (2013.01) |
| *G06F 3/042* | (2006.01) |

(52) U.S. Cl.
CPC ............. *G06F 3/0418* (2013.01); *G06F 3/012* (2013.01); *G06F 3/013* (2013.01); *G06F 3/0482* (2013.01); *G06F 3/04842* (2013.01); *G06F 3/0425* (2013.01)

(58) Field of Classification Search
CPC ............ G06F 3/011–3/013; G06F 3/0481; G06F 3/04815; G06F 3/04817; G06F 3/0483; G06F 3/0485; G06F 3/0487; G06F 3/0482; G06F 3/0484; G06F 2203/04802; G06F 3/0418; G06F 3/04842; G06F 1/3231; G06F 3/005; G06F 3/012; G06F 3/0425; G06K 9/00912

See application file for complete search history.

(56) References Cited

U.S. PATENT DOCUMENTS

| H000716 H | * 12/1989 | McDonald ............ G06F 3/0418 |
| | | 178/18.02 |
| 6,215,480 B1 | 4/2001 | Danis et al. |
| 6,646,626 B1 | 11/2003 | Uskali et al. |

(Continued)

FOREIGN PATENT DOCUMENTS

| EP | 0324306 | 7/1989 |
| EP | 0495199 | 7/1992 |

OTHER PUBLICATIONS

Sears, "Improving Touchscreen Keyboards: Design issues and a comparison with other devices" Interacting with computers 3.3, Mar. 11, 1991, pp. 1-18.

(Continued)

*Primary Examiner* — Nicholas Ulrich
(74) *Attorney, Agent, or Firm* — Kevin Jordan; Michael A. Petrocelli

(57) ABSTRACT

A method and system for providing viewing angle sensitive graphics on an electronic device which detects a user viewing a display of an electronic device. The display has a plurality of items displayed for selection by the user, and the display defines a sensitive area including one or more of the plurality of items. A viewing angle of the user is determined based on a facial recognition technique. The sensitive area is adjusted based on the viewing angle, which can include moving the viewing angle, or adjusting a selection by the user from a first item to a second item based on the viewing angle.

9 Claims, 6 Drawing Sheets

(56) References Cited

U.S. PATENT DOCUMENTS

| | | |
|---|---|---|
| 7,639,224 B2 | 12/2009 | Moon |
| 7,750,936 B2 | 7/2010 | Provinsal et al. |
| 8,169,418 B2 | 5/2012 | Birkler |
| 8,291,344 B2* | 10/2012 | Chaudhri ............... 715/838 |
| 8,884,928 B1* | 11/2014 | Baldwin ............ G06F 3/0488 345/173 |
| 2005/0243054 A1* | 11/2005 | Beymer et al. ............ 345/156 |
| 2010/0188371 A1* | 7/2010 | Lowles ............ G06F 3/04886 345/178 |
| 2012/0032896 A1* | 2/2012 | Vesely ............... G06F 3/005 345/173 |
| 2012/0054690 A1* | 3/2012 | Lim ........................... 715/852 |
| 2012/0235885 A1 | 9/2012 | Miller et al. |
| 2013/0267295 A1* | 10/2013 | Frabbiele ........... G07F 17/3211 463/16 |
| 2013/0293488 A1* | 11/2013 | Na et al. .................... 345/173 |
| 2013/0314543 A1* | 11/2013 | Sutter et al. ............... 348/159 |
| 2014/0099003 A1* | 4/2014 | Langley et al. ............ 382/115 |
| 2014/0118255 A1* | 5/2014 | Billerbeck ............. G06F 3/017 345/158 |
| 2014/0118266 A1* | 5/2014 | MacInnes ............ G06F 3/0418 345/173 |
| 2014/0145966 A1* | 5/2014 | Gardenfors .......... G06F 3/0418 345/173 |
| 2014/0267177 A1* | 9/2014 | Bathiche ............. G06F 3/0488 345/178 |
| 2015/0082180 A1* | 3/2015 | Ames et al. .................. 715/738 |

OTHER PUBLICATIONS

Albinsson et al., "High Precision Touch Screen Interaction," CHI 2003, vol. No. 5, Issue No. 1 Apr. 5-10, 2003, pp. 105-112.

Cheng et al., "Estimating Virtual Touchscreen for Fingertip Interaction with Large Displays," OZCHI 2006, Nov. 20-24, 2006, pp. 397-400.

Henze et al., "Observational and Experimental Investigation of Typing Behaviour using Virtual Keyboards on Mobile Devices," CHI'12, May 5-10, 2012.

* cited by examiner

METHOD AND SYSTEM PROVIDING VIEWING-ANGLE SENSITIVE GRAPHICS INTERFACE SELECTION COMPENSATION

BACKGROUND

1. Field

The present disclosure relates to a method and system for providing selection compensation based on a viewing angle of a user viewing a display of a device.

2. Background of the Disclosure

Typically user interfaces or displays on devices are configured to be viewed directly in front of a user, for example, ahead of the user, or straight down from above. These devices do not consider that the display may be viewed from various angles by a user, and that the viewing angle can cause the user to select erroneous items displayed on the device. Thus, current graphics user interfaces do not compensate for the angle at which a user is viewing an interface. One problem that occurs when a user views a display at an angle that is not directly above the display is the items or objects displayed can appear closer or farther away, which can be from a phenomenon called parallax. Parallax can be referred to as a visual distortion, and can be defined as a displacement or difference in the apparent position of an object viewed along two or more different lines of sight.

As display sizes increase, it is increasingly likely that a user will not always view an interface directly from above, or directly ahead, and thus will have to constantly move their head to maintain a directly line of vision. In one example of currently used user displays, when viewed from an angle, the screen locations of objects or items displayed appear closer to the user than they actually are, causing the user to aim poorly in selecting the on-screen objects.

BRIEF SUMMARY OF THE DISCLOSURE

One problem that occurs when a user views a display at an angle that is not directly above the display, or directly in line with the display, is the items or objects displayed can appear closer or farther way, due to the phenomenon called parallax. Therefore, there is a need for a method and system to provide a technique for detecting and adjusting for viewing distortion related to a viewing angle of a user in relation to a device's display.

According to an aspect of the invention, a method of providing viewing angle sensitive graphics on an electronic device includes detecting a user viewing a display of an electronic device. The display has a plurality of items displayed for selection by the user, and the display defines a sensitive area including one or more of the plurality of items. A viewing angle of the user is determined based on a facial recognition technique, and an adjustment of the sensitive area is based on the viewing angle.

In another aspect of the invention, an electronic device includes viewing angle sensitive graphics. The electronic device includes a display including a plurality of items displayed for selection by a user, and the display defines a sensitive area including one or more of the plurality of items. A facial recognition module determines a viewing angle of the user based on a facial recognition technique. An adjustment module adjusts the sensitive area based on the viewing angle.

In another aspect of the invention, a computer program product provides viewing angle sensitive graphics. The computer program product includes a computer readable storage device having program code embodied therewith. The program code is readable/executable by a processor to perform a method, which comprises: detecting a user viewing a display of an electronic device, the display having a plurality of items displayed for selection by the user, and the display defining a sensitive area including one or more of the plurality of items; determining a viewing angle of the user based on a facial recognition technique; and adjusting the sensitive area based on the viewing angle.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
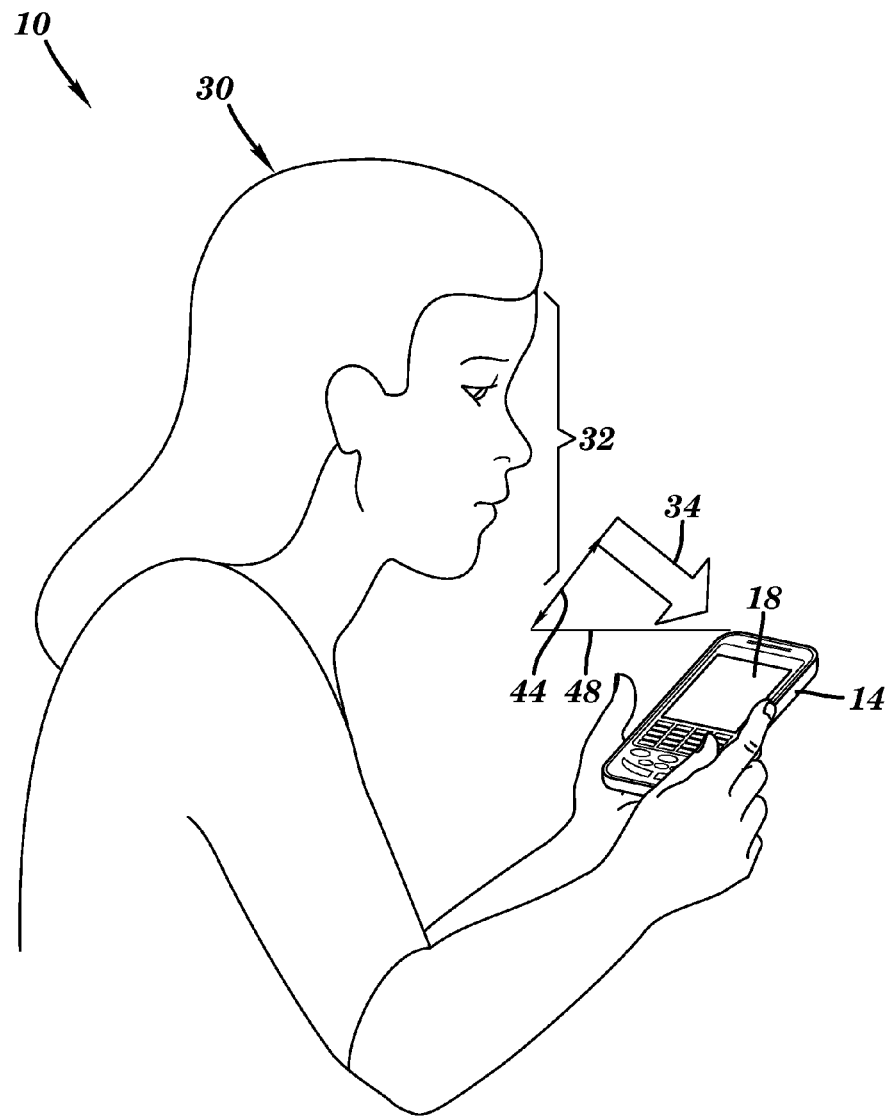
FIG. 1 is a schematic block diagram illustrating an overview of a methodology for detecting a user's viewing angle in relation to a display while the user is viewing a device.
Figure 1A:
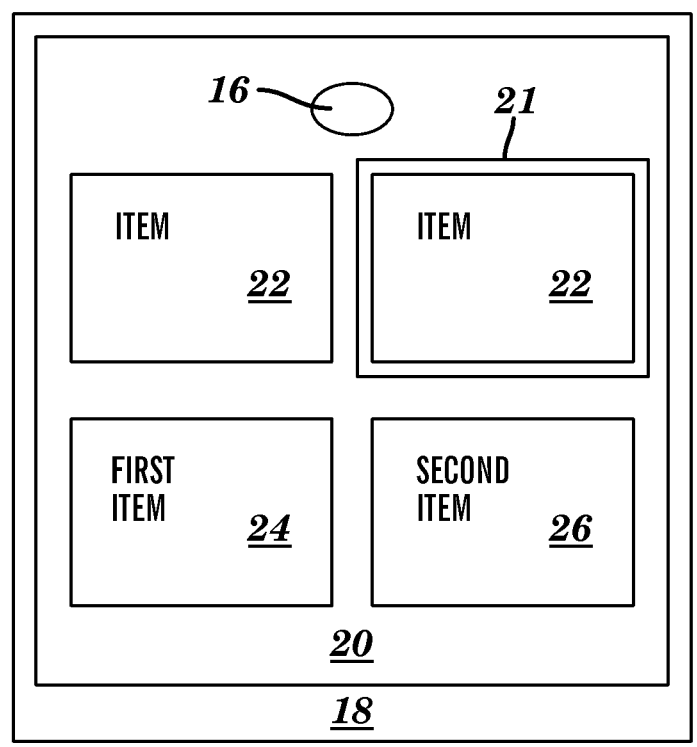
FIG. 1A is a schematic block diagram illustrating a display of the device shown in FIG. 1.
Figure 1B:
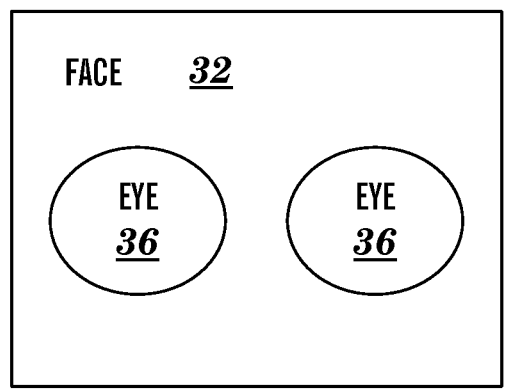
FIG. 1B is a schematic block diagram of a user's face including the user's eyes.
Figure 2:
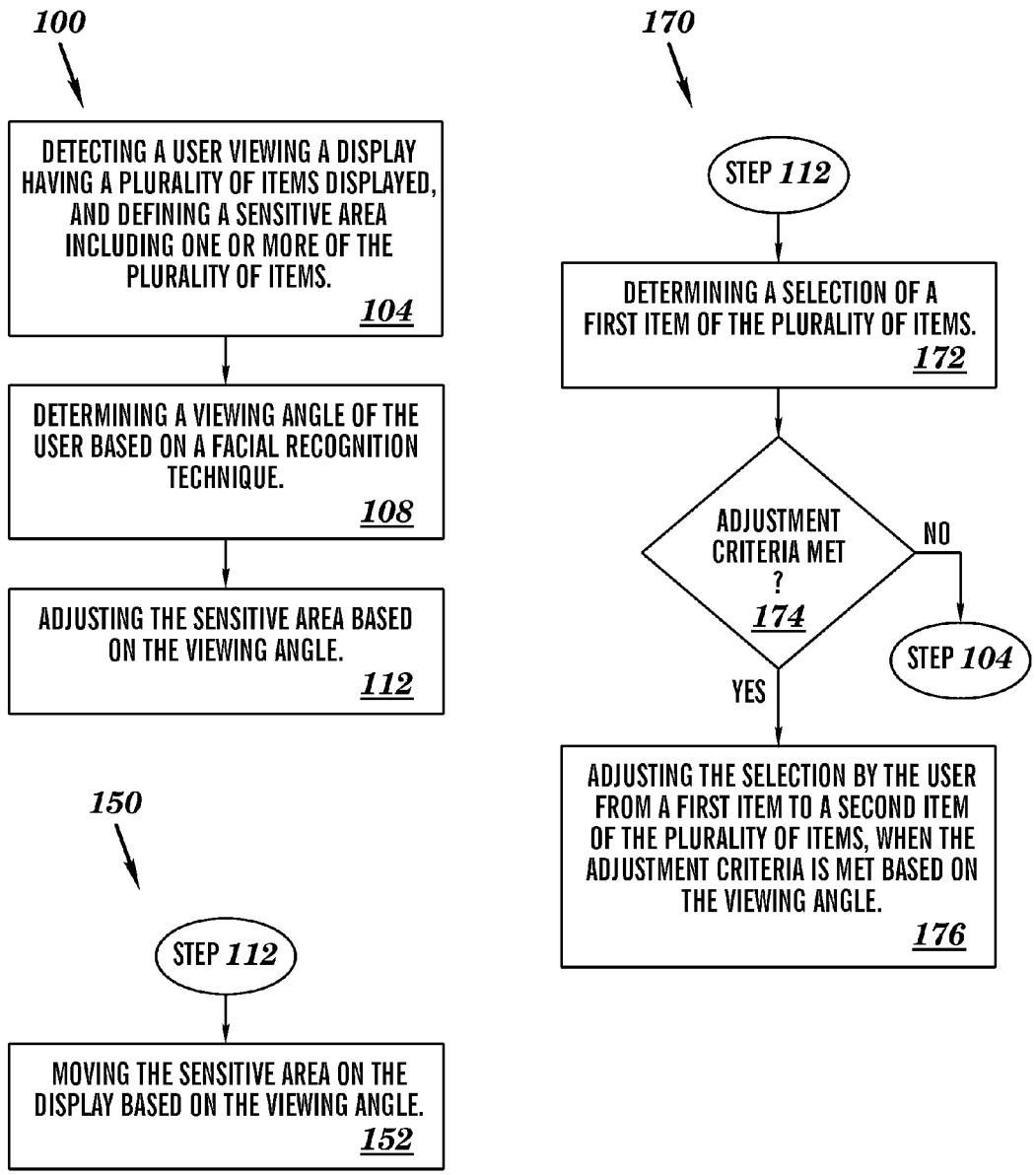
FIG. 2 is a flow chart illustrating a method for detecting and adjusting for a user's viewing angle in relation to a device.

Referring to FIGS. 1 and 2, a system 10 and a method 100 is described for providing viewing angle sensitive graphics on a display of an electronic device. The method includes detecting a viewing angle of a user relative to a display. A device 14 has a display embodied as touch display 18 for viewing by a user 30. The display includes a display sensitive area 20 and a item sensitive area 21, which are representative of sensitive areas on the touch display 18. The line of view 34 is illustrated by an arrow. The display 18 can include a plurality of items 22 as shown in FIG. 1A. The items 22 include a first item 24 and a second item 26 for generically representing multiple items on a display. The items or objects on a display may include icons representing applications, bookmarks, shortcuts, or documents. It is understood that the device 14 is a generic representation of a device that includes a screen or display which can depict a plurality of items, for example, icons. The device can be embodied as a multitude of devices which have a display, for example, a computer, Personal Data Assistant (PDA), cell phone, or a notebook computer, or the like, and also including: a laptop, a netbook, a tablet, or a car communications system having a display.

The display sensitive area 20 can surround all the items displayed on the display 18. In one example, the display sensitive area 20 leaves a perimeter border around the display which is not sensitive to a user's touch. The item sensitive area 21 can surround the item 22. The item sensitive area 21 is shown surrounding one of the items 22, for illustrative purpose. It is understood that a sensitive area can surround each of the items, or any combination of items. It is envisioned that the display sensitive area and the item sensitive area can be moved on the display, its size changed, and/or be a desired geometry, e.g., square, circular, rectangular.

Figure 1C:
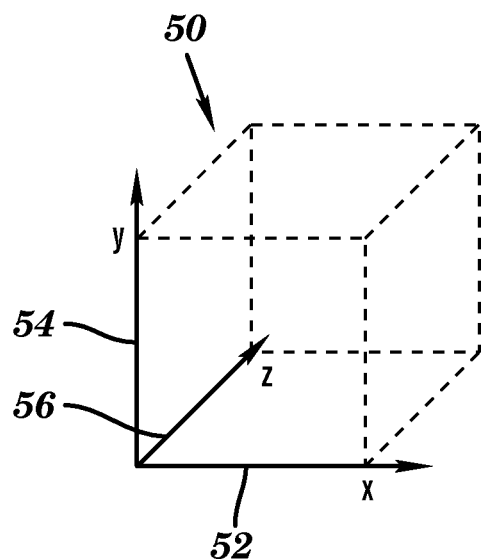
FIG. 1C is a diagram of three axes, X, Y, and Z, in different directions as illustrated.

The method 100 includes detecting a user viewing a display 18, as in step 104. The plurality of items 22 displayed (and representative first and second items 24, 26) are for selection by the user as shown in FIG. 1A. Step 108 includes determining a viewing angle of the user based on a facial recognition technique. The viewing angle can be defined using x, y, and z axes 50, wherein the X 52 axis, Y 54, and Z 56 axes extend as depicted in FIG. 1C. The user's viewing of the display can move along the x, y, z axes 50 and rotate about those axes 50. A viewing angle 44 can be determined using the facial recognition technique which can include detecting a user's face 32 using a camera lens 16 in the device 34. For example, the facial recognition technique can include detecting the user's eyes 36, and determining the angle 44 of the user's viewing using the positioning of the user's eyes 34. The viewing angle 44 can also be defined as the angle from a horizontal plane 48 to the viewing direction 34 of the user 30, that is, the viewing angle can further be determined based on an angular displacement of the device from a horizontal plane. The viewing angle can further be determined based on an angular displacement and a rotational displacement along the X 52, Y 54, and Z 56, axes in relation to the user's face as part of the facial recognition technique.

The method 100 according to the present disclosure can adjust the sensitive area based on the viewing angle, as in step 112. For example, in an embodiment according to the present disclosure, a method 150 continues from step 112 of method 100 to move the sensitive area on the display based on the viewing angle, as in step 152 shown in FIG. 2. The display sensitive area 20 or the item sensitive area 21 can be moved in relation to the display 18, e.g., up, down, left or right, thereby shifting the sensitive areas on the display. Further, the sensitive areas can be changed, for example, expanded to be larger, or a different shape.

In another embodiment according to the disclosure, a method 170 shown in FIG. 2 according to an embodiment of the present disclosure, continues from step 112 of method 100 and can adjust a selection of one of the items 22 by the user from a first item 24 to a second item 26 based on the viewing angle 44. For example, the method 170 includes determining a selection of the first item 24 of the plurality of items 22 in step 172. Step 174 includes deciding if an adjustment criteria is met. For example, the adjustment criteria can include calculating a distortion factor based on the viewing angle and determining that the user meant to select the second item but actually selected the first item because of the distortion factor. That is, because of the distortion factor based on the viewing angle, the selection of the first item actually looked like the selection of the second item to the user. The distortion can be referred to as parallax as discussed above. The distortion factor can be calculated by determining the viewing angle, and specifying when the viewing angle reaches a threshold, the distortion to the display by the user will affect the user's selection of an item.

When the adjustment criteria in not met, the method 170 returns to step 104.

When the adjustment criteria is met, step 176 includes adjusting the selection to the second item 26 of the plurality of items, when the adjustment criteria is met based on the viewing angle 44. The selection by the user is adjusted because the user actually meant to select the second item 26, but because of the viewing angle and the distortion this caused, the user selected the first item 24. Thus, the erroneous selection is remedied by the adjustment according to the present disclosure.

In an embodiment of the disclosure, the facial recognition can include detecting the user's eyes 36 to determine the viewing angle 44 of the user 30 in relation to the display 18. As described above, the method can adjust the selection for the viewing angle. In other word, the distortion caused by the viewing angle of the user to the screen, can be compensated for by the method and system described above. In the embodiments described above, the location of the items on the display is not changed, the viewing angle which can created distortion in the view of the user is compensated for using the method above.

In the embodiment of the disclosure above, the step of adjusting the selection by the user is completed without changing a location of the plurality of items displayed on the display.

In one embodiment according to the disclosure, a front-facing camera 16 on the device 14 captures a stream of images. Face recognition software can be used to identify the face 32 in the images, and the eyes 36 in the face 32. When a face is found, the camera focus is used to detect the distance of the face from the camera, by obtaining the focal length at which the face is in focus. The image and distance are combined to give a spatial location for the eyes, that is, a vector relative to the device, e.g., the arrow 34. This information can be used to calculate the viewing angle 44 for any part of the screen 18, as the vector 34 to the desired screen location from the camera can be calculated, so that the length and angle of two sides of a triangle are known. The third side of the triangle can be the line from the face 32 to a desired point on the screen.

In another embodiment, if the device is moved, the change in device orientation is detected through the device's accelerometer and gyroscope, and a new location is calculated relative to the original location, even if the user's face is no longer visible to the camera.

Figure 3:
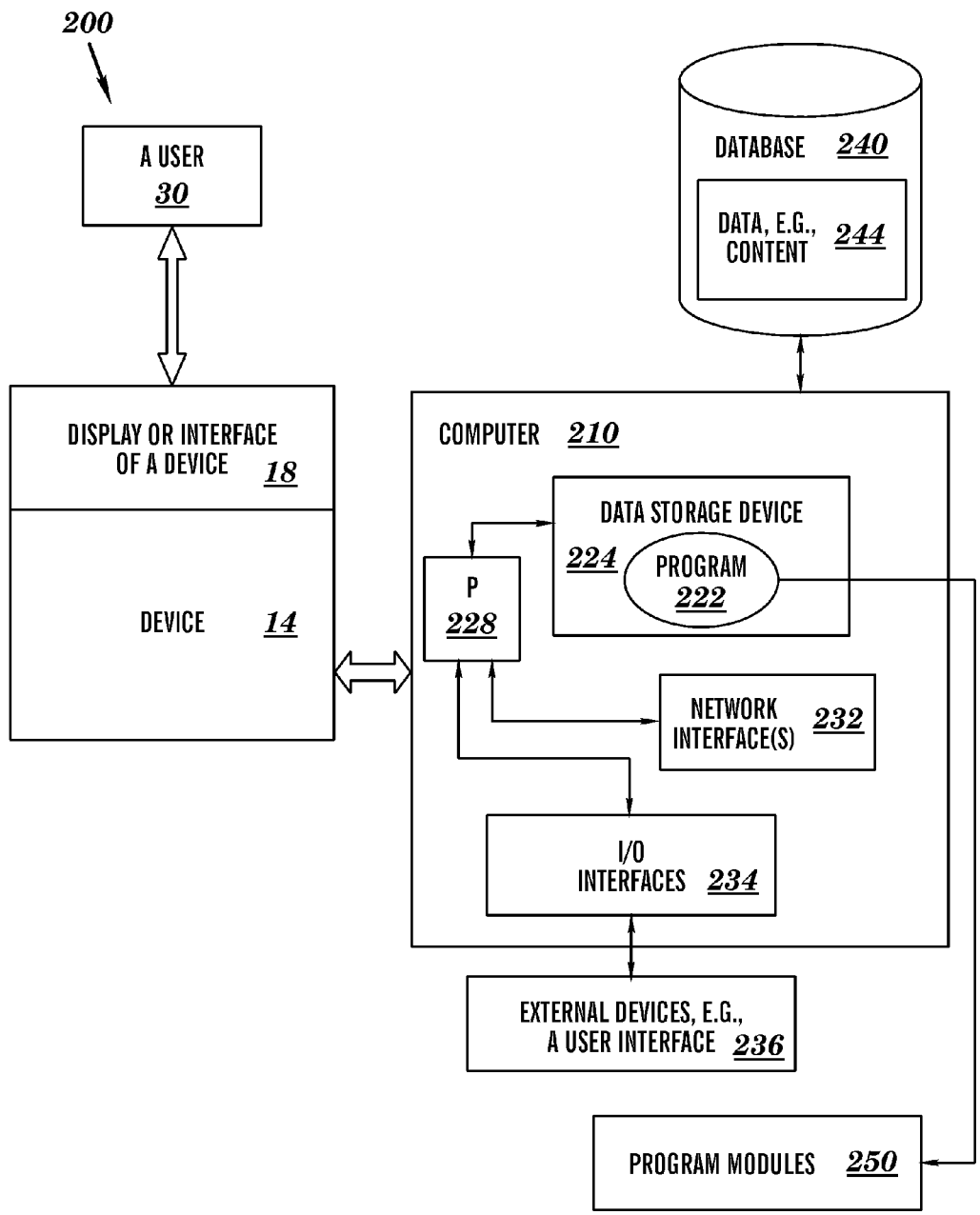
FIG. 3 is a schematic block diagram illustrating a computer system for use in the methodologies shown in FIGS. 1 and 2.
Figure 4:
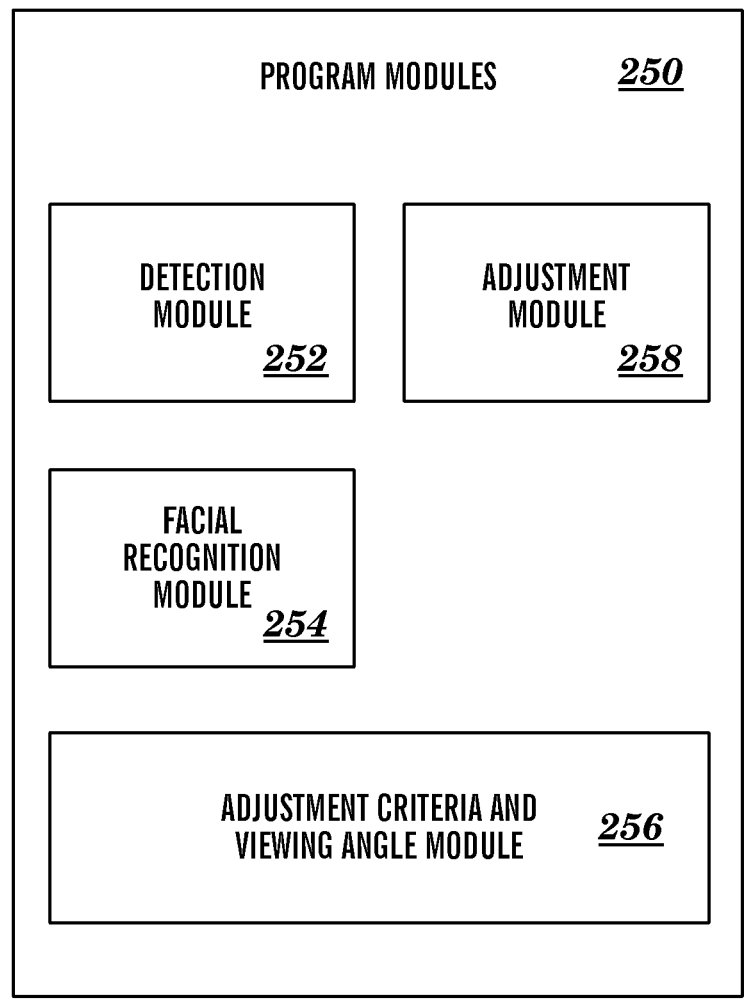
FIG. 4 is a detailed schematic block diagram of the program modules shown in FIG. 3.

Referring to FIGS. 3 and 4, an embodiment of a computer system 200 interacting with the user 30 and a device 14 may include the method 100 embodied in a program 22 embodied on a computer readable storage device, e.g., data storage device 24, and which is executable by a processor 28 of a computer 210 (i.e., execute program steps, code, or program code). The program may also be stored and run locally on a user device. The program or executable instructions therefrom, may be offered as a service by a provider, in one embodiment of the disclosure. The computer 210 and program 222 shown in FIG. 3 are generic representations of a computer and program that may be local to a user, or provided as a remote service, such as a website accessible using the Internet. The computer 210 as a generic computer system can also be representative of a computer system of a desktop computer, or a hand held device, a personal data assistant (PDA), a laptop, etc., or part of one or more servers, alone or as part of a datacenter. The computer 210 can include a network interface 232, and input/output (I/O) interface(s) 234. The I/O interface 234 allows for input and output of data with an external device 236 that may be connected to the computing device. The network interface 232 may provide communications between the computing device and a computer network.

The program 22 may include program modules 250 for executing specific steps, routines, sub-routines, instructions or code, of the program. Such modules 250 are generically represented in FIG. 3, and shown in more detail in FIG. 4. Referring to FIG. 4, a detection module 252 detects the user viewing the display 18 using a facial recognition module 254. An adjustment criteria and viewing angle module 256 is used to determine the viewing angle of the user based on the facial recognition technique, and determine if an adjustment criteria is met. An adjustment module 258 is used to adjust a selection by the user of the plurality of items from, for example, a first item 24 to a second item 26 based on the viewing angle 44 and meeting an adjustment criteria (as in step 174).

Thereby, the method according to the present disclosure provides automatic compensation for the viewing angle at which a user is viewing a graphics screen or display when interpreting the user's touch screen selections.

While embodiments of the present invention has been particularly shown and described with respect to preferred embodiments thereof, it will be understood by those skilled in the art that changes in forms and details may be made without departing from the spirit and scope of the present application. It is therefore intended that the present invention not be limited to the exact forms and details described and illustrated herein, but falls within the scope of the appended claims.

Therefore, one or more Figures described herein may illustrate a schematic of an embodiment of the disclosure and may include a representative computer system or processing system that may implement a method and a program in one or more embodiments of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with one or more processing systems in the present disclosure may include, but are not limited to, personal computer systems, server computer systems, handheld or laptop devices, multiprocessor systems, microprocessor-based systems, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units, a system memory, and a bus that couples various system components including system memory to processor. Computer system may include a variety of computer system readable media. Such media may be any available media that is accessible by computer system, and it may include both volatile and non-volatile media, removable and non-removable media. System memory 58, shown in FIG. 1, can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices such as a keyboard, a pointing device, a display, etc.; one or more devices that enable a user to interact with computer system; and/or any devices (e.g., network card, modem, etc.) that enable computer system to communicate with one or more other computing devices. Such communication can occur via Input/Output (I/O) interfaces. Additionally, computer systems can communicate with one or more networks such as a local area network (LAN), a general wide area network (WAN), and/or a public network (e.g., the Internet) via network adapter. As depicted, network adapter communicates with the other components of computer system via bus. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The computer program product may comprise all the respective features enabling the implementation of the methodology described herein, and which—when loaded in a computer system—is able to carry out the methods. Computer program, software program, program, or software, in the present context means any expression, in any language, code or notation, of a set of instructions intended to cause a system having an information processing capability to perform a particular function either directly or after either or both of the following: (a) conversion to another language, code or notation; and/or (b) reproduction in a different material form.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

Various aspects of the present disclosure may be embodied as a program, software, or computer instructions embodied in a computer or machine usable or readable medium, which causes the computer or machine to perform the steps of the method when executed on the computer, processor, and/or machine. A program storage device readable by a machine, tangibly embodying a program of instructions executable by the machine to perform various functionalities and methods described in the present disclosure is also provided.

The system and method of the present disclosure may be implemented and run on a general-purpose computer or special-purpose computer system. The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, and/or server. A module may be a component of a device, software, program, or system that implements some "functionality", which can be embodied as software, hardware, firmware, electronic circuitry, or etc.

Additionally, as will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Further, any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages, a scripting language such as Perl, VBS or similar languages, and/or functional languages such as Lisp and ML and logic-oriented languages such as Prolog. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams as may be illustrated in the one or more Figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The embodiments, features, and instructive examples described above are illustrative, and should not be construed to limit the present disclosure to the particular embodiments or enumerated examples. Thus, various changes and modifications may be effected by one skilled in the art without departing from the spirit or scope of the disclosure as defined in the appended claims.

What is claimed is:

1. A method of providing viewing angle sensitive graphics on an electronic device, comprising:
    detecting a user viewing a display of an electronic device, the display having a plurality of items displayed for selection by the user, the display defining a sensitive area including the plurality of items, the display being a touch sensitive display and the sensitive area being responsive to a user's selection of one or more of the plurality of items by the user touching one or more of the items;
    determining a viewing angle of the user based on a facial recognition technique, the facial recognition technique includes detecting the user's face using a camera lens in the device and detecting the user's eyes, the determining a viewing angle further including:
    determining a position of the user's eyes in relation to the display;
    determining a viewing direction of the user with respect to a horizontal plane;
    determining a rotational displacement along an axis and an angular displacement of the device from the horizontal plane; and
    the angular displacement and the rotational displacement being along X, Y, and Z axes in relation to the user's face as part of the facial recognition technique;
    based on the determining the viewing angle, either:
    i) adjusting the sensitive area based on the viewing angle, the adjusting including one or more of: moving the sensitive area on the display, expanding the sensitive area, and changing a shape of the sensitive area; or
    ii) detecting the selection of a first item by the user; assessing the viewing angle in relation to the selection of the first item to determine when an adjustment criteria is met, the adjustment criteria including calculating a distortion factor based on the viewing angle and a parallax including a displacement in an apparent position of one or more of the displayed items viewed along two or more different lines of sight, and
    adjusting the selection from the first item to a second item when the adjustment criteria is met, wherein the adjusting the sensitive area includes adjusting the selection by the user from the first item to the second item based on the viewing angle;
    wherein the camera lens in the device captures a stream of images, and the method further comprises focusing the camera lens to detect a distance from the user's face from the camera, and using the stream of images and distance to determine a spatial location for the eyes including a vector between the user's face and the display, the distance, vector, and the horizontal plane being used to calculate the viewing angle.

2. The method of claim 1, wherein the adjusting the selection by the user from the first item to the second item is completed without changing a location of the plurality of items displayed on the display.

3. The method of claim 1, further comprising:
    detecting a change in an orientation of the device using an accelerometer and a gyroscope in the device; and
    calculating a new location relative to an original location of the device even when the user's face is not visible to the camera.

4. An electronic device including viewing angle sensitive graphics, which comprises:
    a computer system comprising a processor, a computer-readable storage medium, and program instructions stored on the computer-readable storage medium, the program instructions being executable by the processor;
    a display including a plurality of items displayed for selection by a user, the display defining a sensitive area including the plurality of items, the display being a touch sensitive display and the sensitive area being responsive to a user's selection of one or more of the plurality of items by the user touching one or more of the items;
    a facial recognition module being part of the program and being configured for determining a viewing angle of the user based on a facial recognition technique, the facial recognition technique includes detecting the user's face using a camera lens in the device and detecting the user's eyes;
    a viewing angle module being part of the program and being configured for determining the viewing angle based on an angular displacement of the device from a horizontal plane, the viewing angle being based on:
    a position of the user's eyes in relation to the display;
    a viewing direction of the user with respect to a horizontal plane;
    a rotational displacement along an axis and the angular displacement of the device from the horizontal plane; and
    the angular displacement and the rotational displacement being along X, Y, and Z axes in relation to the user's face as part of the facial recognition technique; and
    either:
    i) an adjustment module being part of the program and being configured for adjusting the sensitive area based on the viewing angle, the adjusting including one or more of: moving the sensitive area on the display, expanding the sensitive area, and changing a shape of the sensitive area, or ii) the adjustment module being configured to detect the selection of a first item of the plurality of items by the user and assess the viewing angle in relation to the selection of the first item to determine when an adjustment criteria is met, the adjustment criteria including calculation of a distortion factor based on the viewing angle and a parallax including a displacement in an apparent position of one or more of the displayed items viewed along two or more different lines of sight, and the adjustment module being configured to adjust the selection by the user to a second item of the plurality of items, when the adjustment criteria is met based on the viewing angle;

wherein facial recognition module is configured for the camera lens in the device to capture a stream of images, and the facial recognition module is further configured to focus the camera lens to detect a distance from the user's face from the camera, and use the stream of images and distance to determine a spatial location for the eyes including a vector between the user's face and the display, the distance, vector, and the horizontal plane being used to calculate the viewing angle.

5. The electronic device of claim 4, further comprising: detecting a change in an orientation of the device using an accelerometer and a gyroscope in the device; and calculating a new location relative to an original location of the device even when the user's face is not visible to the camera.

6. The electronic device of claim 4, wherein the adjustment module is configured to adjust the selection by the user from the first item to the second item without changing a location of the plurality of items displayed on the display.

7. A computer program product for providing viewing angle sensitive graphics, the computer program product comprising a non-transitory computer readable storage device having program code embodied therewith, the program code being readable/executable by a processor to perform a method, comprising:

detecting a user viewing a display of an electronic device, the display having a plurality of items displayed for selection by the user, the display defining a sensitive area including the plurality of items, the display being a touch sensitive display and the sensitive area being responsive to a user's selection of one or more of the plurality of items by the user touching one or more of the items;

determining a viewing angle of the user based on a facial recognition technique, the facial recognition technique includes detecting the user's face using a camera lens in the device and detecting the user's eyes, the determining a viewing angle further including:

determining a position of the user's eyes in relation to the display;

determining a viewing direction of the user with respect to a horizontal plane;

determining a rotational displacement along an axis and an angular displacement of the device from the horizontal plane; and the angular displacement and the rotational displacement being along X, Y, and Z axes in relation to the user's face as part of the facial recognition technique;

based on the determining the viewing angle, either:

i) adjusting the sensitive area based on the viewing angle, the adjusting including one or more of: moving the sensitive area on the display, expanding the sensitive area, and changing a shape of the sensitive area; or ii) detecting the selection of a first item by the user;

assessing the viewing angle in relation to the selection of the first item to determine when an adjustment criteria is met, the adjustment criteria including calculating a distortion factor based on the viewing angle and a parallax including a displacement in an apparent position of one or more of the displayed items viewed along two or more different lines of sight, and adjusting the selection from the first item to a second item when the adjustment criteria is met, wherein the adjusting the sensitive area includes adjusting the selection by the user from the first item to the second item based on the viewing angle;

wherein the camera lens in the device captures a stream of images, and the method further comprises focusing the camera lens to detect a distance from the user's face from the camera, and using the stream of images and distance to determine a spatial location for the eyes including a vector between the user's face and the display, the distance, vector, and the horizontal plane being used to calculate the viewing angle.

8. The computer program product of claim 7, further comprising:

the viewing angle module being configured to detect a change in an orientation of the device using an accelerometer and a gyroscope in the device; and the viewing angle module being configured to calculate a new location relative to an original location of the device even when the user's face is not visible to the camera.

9. The computer program product of claim 7, wherein the adjusting the selection by the user from the first item to the second item is completed without changing a location of the plurality of items displayed on the display.

* * * * *